United States Patent
Gotou et al.

(10) Patent No.: US 12,214,803 B2
(45) Date of Patent: Feb. 4, 2025

(54) TRAVEL ASSISTANCE METHOD AND TRAVEL ASSISTANCE DEVICE

(71) Applicant: Nissan Motor Co., Ltd., Yokohama (JP)

(72) Inventors: Akinobu Gotou, Kanagawa (JP); Takashi Fukushige, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 551 days.

(21) Appl. No.: 17/618,070

(22) PCT Filed: Jun. 14, 2019

(86) PCT No.: PCT/IB2019/000634
§ 371 (c)(1),
(2) Date: Jun. 30, 2022

(87) PCT Pub. No.: WO2020/249995
PCT Pub. Date: Dec. 17, 2020

(65) Prior Publication Data
US 2022/0340168 A1 Oct. 27, 2022

(51) Int. Cl.
*B60W 60/00* (2020.01)

(52) U.S. Cl.
CPC ... *B60W 60/0013* (2020.02); *B60W 2520/105* (2013.01); *B60W 2552/53* (2020.02);
(Continued)

(58) Field of Classification Search
CPC ......... B60W 60/0013; B60W 2554/20; B60W 2554/4041; B60W 2552/53; B60W 2556/40; B60W 2520/105
See application file for complete search history.

(56) References Cited

U.S. PATENT DOCUMENTS 10,042,359 B1 * 8/2018 Konrardy ............... G06Q 50/40
11,480,962 B1 * 10/2022 Dax ...................... G06V 20/588
(Continued)

FOREIGN PATENT DOCUMENTS

| JP | 2005-164379 A | 6/2005 |
| JP | 2017-016645 A | 1/2017 |

(Continued)

*Primary Examiner* — Peter D Nolan
*Assistant Examiner* — Wae L Louie
(74) *Attorney, Agent, or Firm* — Young Basile Hanlon & MacFarlane, P.C.

(57) ABSTRACT

A travel assistance method is executed by a processor and comprises: acquiring, from a device for storing map information, information on static traveling path boundaries between a traveling path of a subject vehicle and other than the traveling path; acquiring, from a sensor for detecting surrounding environment of the subject vehicle, information on dynamic traveling path boundaries different from the static traveling path boundaries; generating, based on the information on the static traveling path boundaries, a static traveling path on which the subject vehicle can travel; generating, based on the information on the static traveling path and the dynamic traveling path boundaries, a dynamic traveling path which is shorter than the static traveling path and corresponds to the surrounding environment; and controlling the subject to travel along a traveling path including the static traveling path and the dynamic traveling path.

20 Claims, 10 Drawing Sheets

(52) U.S. Cl.
CPC . *B60W 2554/20* (2020.02); *B60W 2554/4041* (2020.02); *B60W 2556/40* (2020.02)

(56) References Cited

U.S. PATENT DOCUMENTS

| | | | |
|---|---|---|---|
| 2013/0218467 A1 | 8/2013 | Ogawa et al. | |
| 2015/0300825 A1* | 10/2015 | Manoliu | G01C 21/3667 |
| | | | 701/409 |
| 2016/0375901 A1 | 12/2016 | Di Cairano et al. | |
| 2018/0004215 A1* | 1/2018 | Miller | B60W 50/0097 |
| 2019/0079523 A1* | 3/2019 | Zhu | G05D 1/0274 |
| 2019/0086226 A1* | 3/2019 | Hamada | G05D 1/0061 |
| 2019/0086925 A1 | 3/2019 | Fan et al. | |
| 2019/0347821 A1* | 11/2019 | Stein | G01C 21/3658 |
| 2019/0354779 A1* | 11/2019 | Zhao | G06V 20/588 |
| 2019/0384304 A1* | 12/2019 | Towal | G05D 1/0221 |
| 2020/0047753 A1 | 2/2020 | Kato et al. | |
| 2020/0114917 A1* | 4/2020 | Oguro | B60W 30/181 |
| 2020/0175558 A1 | 6/2020 | Fujimoto et al. | |
| 2020/0189582 A1* | 6/2020 | Fukushige | B60W 30/10 |
| 2020/0257317 A1* | 8/2020 | Musk | G05D 1/0033 |
| 2020/0409386 A1* | 12/2020 | Thakur | G05D 1/0223 |
| 2021/0133466 A1* | 5/2021 | Gier | G05D 1/0223 |
| 2021/0188262 A1* | 6/2021 | Goto | B60W 30/0956 |
| 2022/0080964 A1* | 3/2022 | Fukushige | B60W 10/20 |
| 2022/0340168 A1* | 10/2022 | Gotou | B60W 60/0013 |
| 2023/0126130 A1* | 4/2023 | Jeong | G01C 21/3881 |
| | | | 701/533 |
| 2023/0127185 A1* | 4/2023 | Jeong | G01C 21/3819 |
| | | | 701/25 |
| 2023/0130478 A1* | 4/2023 | Zhang | G06T 7/593 |
| | | | 382/106 |
| 2023/0166763 A1* | 6/2023 | Goto | B60W 40/076 |
| | | | 701/23 |
| 2023/0222267 A1* | 7/2023 | Muehlenstaedt | G06V 20/56 |
| | | | 703/8 |

FOREIGN PATENT DOCUMENTS

| | | |
|---|---|---|
| JP | 2017-193189 A | 10/2017 |
| WO | 2012/014280 A1 | 2/2012 |
| WO | 2016/189727 A1 | 12/2016 |
| WO | 2017/168662 A1 | 10/2017 |
| WO | 2018/066560 A1 | 4/2018 |
| WO | 2018/073886 A1 | 4/2018 |
| WO | 2018/230676 A1 | 12/2018 |
| WO | 2019/082732 A1 | 5/2019 |

* cited by examiner

TRAVEL ASSISTANCE METHOD AND TRAVEL ASSISTANCE DEVICE

TECHNICAL FIELD

The present invention relates to a travel assistance method and a travel assistance device for assisting a traveling of a vehicle.

BACKGROUND

A driving support device is known to be provided with a means for acquiring a plurality of travel route information with different recognition ranges, and a means for generating a course for the vehicle using the plurality of travel route information according to the driving environment (e.g., WO 2012/014280).

The plurality of travel route information includes, for example, a wide area map used to determine a rough travel route from the starting point of the vehicle to the destination, a medium area map used to recognize pedestrians and other vehicles and to predict their movements, and a local area map used to detect and avoid movements of pedestrians and other vehicles that cannot be recognized by the medium area map.

SUMMARY

In the prior art, since it is not possible to combine the paths of the subject vehicle generated from maps with different recognition ranges, there is a problem that it is difficult to make a traveling plan that is compatible with both responding to the surrounding environment and traveling smoothly.

The problem to be solved by the present invention is to provide a travel assistance method and a travel assistance device that can make a traveling plan that is compatible with both responding to the surrounding environment and traveling smoothly.

The present invention solves the above-described problems by acquiring information on static traveling path boundaries between a traveling path of the subject vehicle and other than the traveling path, acquiring information on dynamic traveling path boundaries different from the static traveling path boundaries, generating a static traveling path on which the subject vehicle can travel based on information on the static traveling path boundaries, generating a dynamic traveling path which is shorter than the static traveling path and corresponds to the surrounding environment, based on the information on the static traveling path and the dynamic traveling path boundaries, and controlling the subject vehicle to travel along a target traveling path including the static traveling path and the dynamic traveling path.

According to this invention, it is possible to make the traveling plan that is compatible with both responding to the surrounding environment and traveling smoothly.

DETAILED DESCRIPTION

Hereinafter, a travel assistance device for a vehicle and a method thereof according to an embodiment of the present invention will be described with reference to the drawings. Incidentally, in the present embodiment, the present invention will be described by exemplifying the travel assistance device mounted on a vehicle.

Figure 1:
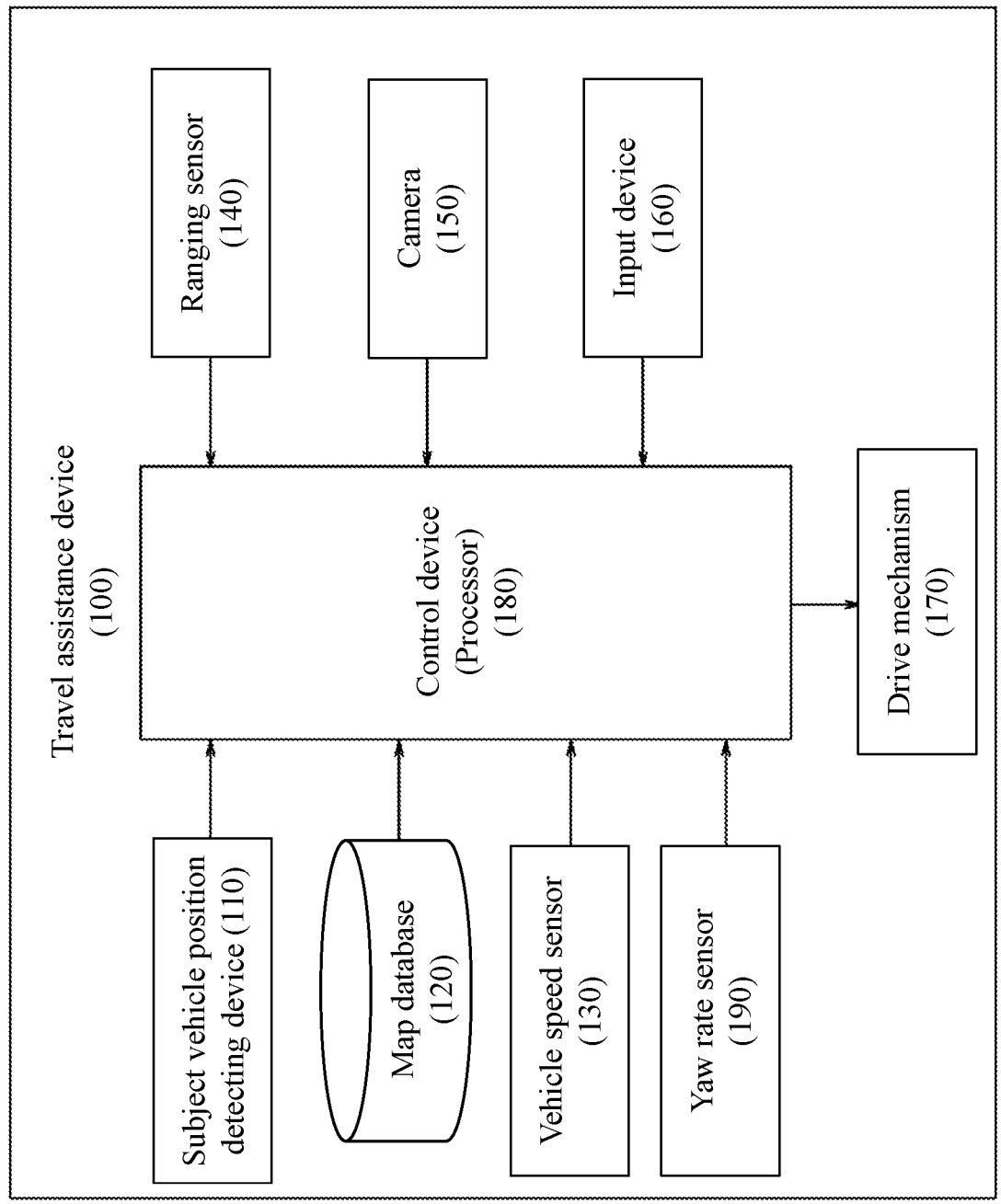
FIG. 1 is a block diagram illustrating a travel assistance device according to an embodiment of the present invention.

FIG. 1 is a diagram illustrating a configuration of a travel assistance device 100 of a vehicle according to an embodiment of the present invention. As shown in FIG. 1, the travel assistance device 100 according to the present embodiment comprises a subject vehicle position detecting device 110, a map database 120, a vehicle speed sensor 130, a ranging sensor 140, a camera 150, a drive mechanism 170, a control device 180, and a yaw rate sensor 190. These components are connected to one another via a controller area network (CAN) or other in-vehicle LAN for mutually exchanging information.

The subject vehicle position detecting device 110 comprises a GPS unit. The subject vehicle position detecting device 110 detects radio waves transmitted from a plurality of satellite communications by a locator (GPS antenna) and periodically acquires positional information of the subject vehicle. The subject vehicle position detecting device 110 detects the current position of the subject vehicle based on the acquired positional information of the subject vehicle, angular change information acquired from a gyro sensor (not shown), and a vehicle speed acquired from the vehicle speed sensor 130. The subject vehicle position detecting device 110 can also detect the position of the subject vehicle on a map using a well-known map matching technique. The positional information of the subject vehicle detected by the subject vehicle position detecting device 110 is output to the control device 180.

The map database 120 contains map information. The map information stored in the map database 120 includes attributes information on roads at each map coordinate. The attributes of roads include, for example, curves, slopes, intersections, interchanges, narrow roads, straight roads, merging points, or the like. The attributes of these roads are merely examples and are not intended to limit the attributes of roads. The attributes of roads include information on road shapes and road slopes. The map information also includes information on a centerline of a lane and a curvature of the lane. The centerline of the lane is a center line of the lane along a traveling direction of a vehicle and is defined for each lane. The curvature of the lane is the curvature at the centerline of the lane, and is defined for each lane.

The map information also includes information on traveling path boundaries. The traveling path boundaries are boundaries between a traveling path of the subject vehicle and other than the traveling path of the subject vehicle. The traveling path of the subject vehicle is a road on which the subject vehicle travels. In other words, the traveling path boundaries are the boundaries that form the road on which the subject vehicle travels. The traveling path boundaries are located on both the left and right sides of the traveling direction of the subject vehicle. The traveling path boundaries may be defined for each lane, or for each road. As map information including information on the traveling path boundaries is, for example, high-precision map information suitable for automated or autonomous driving. The high-precision map information may be acquire, for example, through communication with a server or a system provided outside the subject vehicle, or may be stored in the map database 120 in advance.

In the following description, the traveling path boundaries included in the map information in advance is referred to as static traveling path boundaries. The static traveling path boundaries comprise the road shapes and road widths stored as the map information. The static traveling path boundaries are information that will not be updated unless the map information is updated. For points where the traveling path boundaries cannot be clearly identified (e.g., in an intersection), the traveling path boundaries are set in the map information in advance. The predetermined traveling path boundaries are imaginary traveling path boundaries, not actual road surface markings or road structures. In addition to the road shapes and the road widths, the static traveling path boundaries may also comprise information on locations on the map.

The map information also includes traffic rule information to be observed when the vehicle is traveling. The traffic rule information includes, for example, pauses on a route, parking/stopping prohibitions, slow speed, speed limit (legal speed), and lane change prohibitions, but is not limited to these. The traffic rule information is defined for each lane. Incidentally, these information included in the map information is defined by nodes and links (also referred to as road links) that connect the nodes.

The vehicle speed sensor 130 measures a rotational speed of a drive system, such as a drive shaft, and detects a traveling speed of the subject vehicle (hereinafter, also referred to as a vehicle speed) based on the measured rotational speed. The vehicle speed of the subject vehicle detected by the vehicle speed sensor 130 is output to the control device 180. The yaw rate sensor 190, for example, is mounted in the vehicle cabin and detects the yaw rate of the subject vehicle (a change of rate of a rotation angle in a turning direction). Yaw rate information of the subject vehicle detected by the yaw rate sensor 190 is output to the control device 180. The links are identified at the lane level.

The ranging sensor 140 detects objects existing around the subject vehicle. Further, the ranging sensor 140 calculates the relative distance between the subject vehicle and the objects, the direction in which the objects are located relative to the subject vehicle, and the relative speed of the objects relative to the subject vehicle. Objects include, for example, lane boundaries, center lines, median strips, guardrails, curbs, tunnels, or sidewalls of highways. Other objects include, for example, automobiles other than the subject vehicle (other vehicles), motorcycles, bicycles, road signs, traffic lights, pedestrian crossings, etc. That is, the ranging sensor 140 is a type of sensor that detects the surrounding environment of the subject vehicle. Information of the objects detected by the ranging sensor 140 is output to the control device 180. A laser radar, a millimeter wave radar, etc. (LFR, etc.) can be used as the ranging sensor 140. The ranging sensor 140 has a limited range in which objects can be detected, and detects objects existing within a predetermined range. The predetermined detection range differs depending on the type of the sensor and is defined for each type of the sensor. The number of the ranging sensor 140 is not particularly limited, and the ranging sensor 140 is provided, for example, at the front, the side, and the rear of the subject vehicle. Thus, the ranging sensor 140 detects objects existing in the entire area around the subject vehicle.

The camera 150 images roads and/or objects existing around the subject vehicle. The objects imaged by the camera 150 are the same as the objects detected by the ranging sensor 140. In the present embodiment, the camera 150 images the front of the subject vehicle. Image information captured by the camera 150 is output to the control device 180. The camera 150 is a camera for imaging the front of the subject vehicle and/or a camera for imaging the side of the subject vehicle. Incidentally, the camera 150, similarly to the ranging sensor 140, has a limited range in which objects can be imaged, and images objects existing within a predetermined range. Generally, the imaging range of the camera 150 is narrower than the detection range of the ranging sensor 140, but in the present embodiment, the relationship between the imaging range of the camera 150 and the detection range of the ranging sensor 140 is not particularly limited.

The input device 160 is an operating component that can be operated by a driver. In the present embodiment, the driver sets an on/off of autonomous drive control by operating the input device 160. The driver can also operate the input device 160 to set the destination of the subject vehicle.

The drive mechanism 170 includes engines and/or motors (power systems), brakes (braking systems), and steering actuators (steering systems), etc., for autonomous driving of the subject vehicle. In the present embodiment, when the autonomous driving control to be described later is performed, operation of the drive mechanism 170 is controlled by the control device 180.

The control device 180 is a computer having a processor and comprises a ROM (Read Only Memory) that stores a program for controlling the travelling of the subject vehicle, a CPU (Central Processing Unit) that executes a program stored in the ROM, and a RAM (Random Access Memory) that functions as an accessible storage device. Incidentally, as an operation circuit, a micro processing unit (MPU), a digital signal processor (DSP), an application specific integrated circuit (ASIC), a field programmable gate array (FPGA), and the like can be used as substitute for or in addition to the CPU.

In the present embodiment, a program to be executed by the control device 180 is described as an example of a configuration stored in the ROM in advance, but the location where the program is stored is not limited to the ROM. For example, the program may be stored in a computer-readable and portable computer-readable recording medium (e.g., disk media, flash memory, etc.). In this case, the control device 180 executes a program downloaded from the computer-readable recording medium. In other words, the control device 180 may include only the operation circuit and download the program from the outside.

Figure 2:
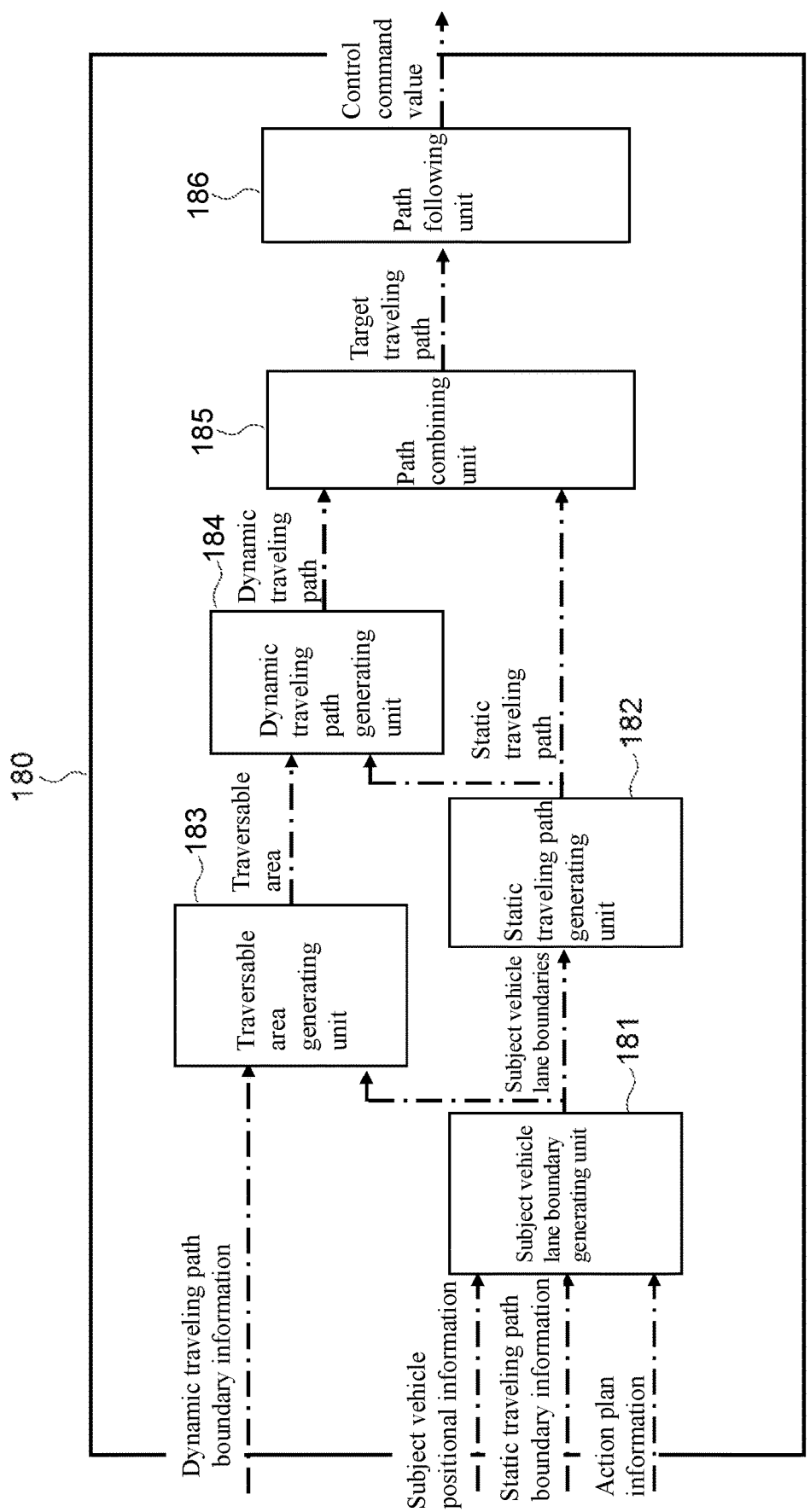
FIG. 2 is a block diagram illustrating each function of the control device shown in FIG. 1.

FIG. 2 is a block diagram illustrating functions of the control device 180. Each function realized by the control device 180 will be described with reference to FIG. 2. As shown in FIG. 2, the control device 180 includes a subject vehicle lane boundary generating unit 181, a static traveling path generating unit 182, a traversable area generating unit 183, a dynamic traveling path generating unit 184, a path combining unit 185, and a path following unit 186. These blocks realize the functions described later by software established in the ROM. In the present embodiment, the functions of the control device 180 are divided into six functional blocks, and the functions of each functional block are described. However, the functions of the control device 180 do not necessarily have to be divided into six blocks, and may be divided into five or fewer functional blocks or seven or more functional blocks. The functions of the control device 180 are not limited to the functions of the functional blocks described below, but also include, for example, a control function of a navigation system. In addition, each block shown in FIG. 2 has a different calculation cycle (also referred to as calculation processing time) of the processor in each process, but the calculation cycle of the processor will be described after the functions are described.

The function of the subject vehicle lane boundary generating unit 181 will be described below. The subject vehicle lane boundary generating unit 181 generates subject vehicle lane boundaries (also referred to as the own lane) between a lane on which the subject vehicle travels and other than the lane. The subject vehicle lane boundary generating unit 181 generates subject vehicle lane boundaries located on the left and right sides in relation to the traveling direction of the subject vehicle, respectively.

The positional information of the subject vehicle from the subject vehicle position detecting device 110, the information on the static traveling path boundaries included in the map information from the map database 120, and the information of the action plan indicating a route plan of the subject vehicle from the navigation system (not shown) are input to the subject vehicle lane boundary unit 181, respectively. In other words, the subject vehicle lane boundary generating unit 181 acquires the current positional information of the subject vehicle from the subject vehicle position detecting device 110, acquires the information on the static traveling path boundaries from the map database 120, and acquires the information of the action plan from the navigation system. The information of the action plan includes at least information on the location of the subject vehicle's destination, information on the location of passing points that the subject vehicle is scheduled to pass before reaching the destination, and information on roads that the subject vehicle is scheduled to travel. In other words, the information of the action plan is rough information on the route to the destination of the subject vehicle.

The subject vehicle lane boundary generating unit 181 generates the subject vehicle lane boundaries based on the various input information. For example, the subject vehicle lane boundary generating unit 181 identifies the lane on which the subject vehicle is traveling from the information of the action plan and the current position of the subject vehicle. The subject vehicle lane boundary generating unit 181 acquires the information on the static traveling path boundaries related to the identified lane from the map information, and generates the subject vehicle lane boundaries based on the information on the static traveling path boundaries. The information on the static traveling path boundaries may include not only information on a lane on which the subject vehicle is traveling, but also information on a lane which is different from the lane and on which the vehicle is scheduled to travel. For example, when the subject vehicle is scheduled to leave the main line currently traveling at the branch point and to travel on the branch line, the information on the static traveling path boundaries includes information on the branch line which is a lane ahead of the branch point, in addition to information on a lane on which the subject vehicle is currently traveling. Further, for example, when the subject vehicle is scheduled to turn right or left at an intersection or the like, the information on the static traveling path boundaries includes information of a lane on which the subject vehicle is scheduled to travel after the right or left turn, in addition to information on a lane on which the subject vehicle is currently traveling. The subject vehicle lane boundaries are based on the information of static traveling path boundaries. The subject vehicle lane boundaries reflect the road shapes and road widths stored in the map information. That is, the subject vehicle lane boundaries generated by the subject vehicle lane boundary generating unit 181 are boundaries between a traveling lane in the map information and other than the traveling lane in the map information. The information on the subject vehicle lane boundaries generated by the subject vehicle lane boundary generating unit 181 are output to the static traveling path generating unit 182 and the traversable area generating unit 183. The subject vehicle positional information shown in FIG. 2 indicates information input from the subject vehicle position detecting device 110, the static traveling path boundary information indicates information input from the map database 120, and the action plan information indicates information input from the navigation system.

Next, the function of the static traveling path generating unit 182 will be described below. The static traveling path generating unit 182 generates a traveling path of the subject vehicle based on the map information as a static traveling path. The static traveling path is an ideal traveling path for the subject vehicle which reflects the road shapes and the road widths stored in the map information.

As shown in FIG. 2, information on the subject vehicle lane boundaries is input to the static traveling path generating unit 182 from the subject vehicle lane boundary generating unit 181. For example, the static traveling path generating unit 182 generates a traveling path in which a change of lateral acceleration applied to the subject vehicle when the subject vehicle travels on the traveling path on the map is minimized, based on information on the subject vehicle lane boundaries and/or lane information, as a static traveling path. When the subject vehicle travels along the static traveling path, the change of lateral acceleration applied to the subject vehicle is minimized. In other words, the static traveling path is a traveling path on which the subject vehicle can travel stably. The information on the static traveling path generated by the static traveling path generating unit 182 is output to the dynamic traveling path generating unit 184 and the path combining unit 185.

As an example of the static traveling path, the traveling path that minimizes the change of the lateral acceleration of the subject vehicle when the subject vehicle travels on the traveling path on the map is used as an example, but the static traveling path is not limited to this. The static traveling path may be a traveling path on which the subject vehicle can travel stably. The static traveling path generating unit 182 may generate a static traveling path using other indicators for stable traveling. The static traveling path may be a traveling path with a minimum change of curvature. Further, the change of lateral acceleration or the change of curvature is not limited to be minimum. For example, the static traveling path may be a traveling path in which the change of the lateral acceleration is equal to or less than a predetermined threshold value or the change of curvature is equal to or less than the threshold value. The static traveling path is not required to be generated using other indicators listed in the above examples. For example, the static traveling path generating unit 182 may generate a traveling path along the centerline of the lane on the map as a static traveling path based on lane information on the map. In this case, for example, the static traveling path is generated as a traveling path in which the change of the lateral acceleration of the subject vehicle is not taken into account.

In addition, the static traveling path generating unit 182 may select the information on the static traveling path boundaries according to the driving scene of the subject vehicle, and generate the static traveling path based on the selected information on the static traveling path boundaries. For example, in a scene where the subject vehicle is traveling on a straight path, the static traveling path generating unit 182 may select information on the static traveling path boundaries including the information on the lane on which the subject vehicle is currently traveling, and generate a static traveling path on the straight path based on the selected information on the static traveling path boundaries. In addition, for example, in a scene where the subject vehicle leaves the main line currently traveling at the branch point and travels on the branch line, the static traveling path generating unit 182 may select information on the static traveling path boundaries to include information on the branch line ahead of the branch point, in addition to the lane on which the subject vehicle is currently traveling, and may generate a static traveling path from before passing the branch point to after passing the branch point based on the selected information on the static traveling path boundaries. In a scene where the subject vehicle turns right or left turn at the intersection or the like, the static traveling path generating unit 182 may select information on the static traveling path boundaries to include information on the lane on which the subject vehicle is scheduled to travel after the right or left turn, in addition to information on the lane on which the subject vehicle is currently traveling, and may generate a static traveling path from before turning right or left at the intersection to after turning right or left at the intersection based on the selected information on the static traveling path boundaries.

Figure 3:
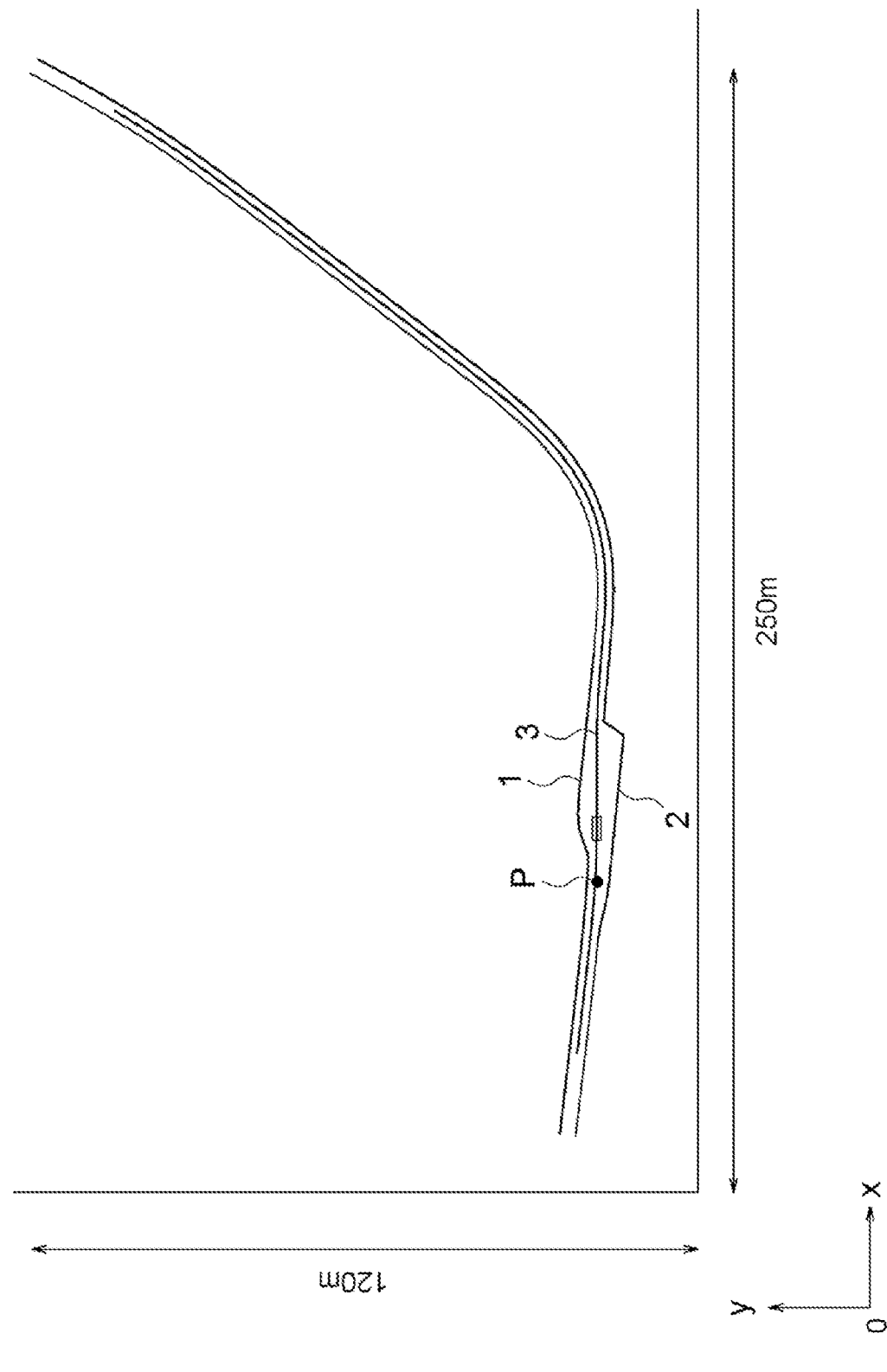
FIG. 3 is a diagram for explaining a static traveling path.

FIG. 3 is a diagram for explaining a static traveling path. In FIG. 3, symbol "1" denotes a static traveling path boundary on the left side relative to the traveling direction of the subject vehicle, symbol "2" denotes a static traveling path boundary on the right side relative to the traveling direction of the subject vehicle, and symbol "3" denotes a static traveling path generated by the static traveling path generating unit 182.

A method of generating a static traveling path will be described with reference to FIG. 3. First, the static traveling path generating unit 182 identifies the static traveling path boundary 1 on the left side and the static traveling path boundary 2 on the right side from the information on the subject vehicle lane boundaries input from the subject vehicle lane boundary generating unit 181. The static traveling path boundary 1 and the static traveling path boundary 2 are traveling path boundaries reflecting the road shapes and the road widths stored in the map information. That is, the static traveling path boundary 1 and the static traveling path boundary 2 are traveling path boundaries defined as the map information.

Next, the static traveling path generating unit 182 sets path length of the static traveling path. For example, the static traveling path generating unit 182 sets the path length of the static traveling path to include at least two corners on the road on which the subject vehicle travels. Further, for example, the static traveling path generating unit 182 sets the path length of the static traveling path to include a section of straight path for a predetermined distance or more after a corner. The straight line is a section of straight path where the curvature is equal to or less than a predetermined threshold and the distance is equal to or longer than a predetermined distance. In the example of FIG. 3, the static traveling path generating unit 182 sets the path length of the static traveling path 3 to about 240 meters.

The static traveling path generating unit 182 generates a static traveling path using, for example, an evaluation function which is a quadratic convex function, and the Newton method. The static traveling path generating unit 182 sets the evaluation function satisfying the following equations (1) and (2) as the static traveling path.

[Equation 1]

$$J = \frac{1}{2}a_s\left(\left(\sum_i (u(i) - y_{si})^2 + \sum_i (u(i) - y_{sr})^2\right)\right) + \frac{1}{2}k_\rho \sum_i (\rho(u(i)))^2 \quad (1)$$

[Equation 2]

$$\frac{\partial J}{\partial u} = 0 \quad (2)$$

However, in the above equations (1) and (2), symbol "J" denotes an evaluation function (static traveling path), symbol "u (i)" denotes the traveling distance of the subject vehicle from the centerline of the traveling path at each point. Symbol "$a_s$" denotes a weighting factor (e.g., $a_s=1$) indicating the magnitude of the influence of the static traveling path boundaries on the static traveling path, symbol "$y_{sl}$" denotes the distance between the static traveling path boundary on the left side and the centerline of the traveling path, and symbol "$y_{sr}$" denotes the distance between the static traveling path boundary on the right side and the centerline of the traveling path. Symbol "$k_\rho$" denotes a weighting factor indicating the magnitude of the influence of the curvature-mitigating factor on a first dynamic traveling path as described below. It is possible to set the allowable curvature according to the vehicle speed by setting a variable value according to the vehicle speed. Symbol "ρ" denotes the curvature.

The static traveling path generating unit 182 calculates u(i) satisfying the above equation (2), and sets the evaluation function J when the calculated u(i) is substituted into the above equation (1), as the static traveling path.

Incidentally, the centerline of the traveling path in the above equation (1) is a centerline which extends along the center of the left and right static traveling path boundaries. As an example of a method for generating the centerline of the traveling path is to calculate potential fields (positional energy) for the left and right static traveling path boundaries, calculate a starting point where the potential energy becomes 0V in the centerline of the traveling path using the Newton method, and search for contour lines with 0V potential energy using RK4 (Runge—Kutta method). The above method for generating the centerline of the traveling path is just an example, and other methods may be used.

Returning again to FIG. 2, the functions realized by the control device 180 will be described. The function of the traversable area generating unit 183 will be described. The traversable area generating unit 183 generates an area the subject vehicle can travel with respect to the surrounding environment of the subject vehicle as a travelable area.

The information of the relative distance between the subject vehicle and the objects, the direction in which the objects are located relative to the subject vehicle, and the relative speed of the objects relative to the subject vehicle are input from the ranging sensor 140 to the traversable area generating unit 183. In addition, the information of the captured image of objects existing around the subject vehicle is input from the camera 150 to the traversable area generating unit 183. The traversable area generating unit 183 identifies dynamic traveling path boundaries which indicate boundaries between the traveling path of the subject vehicle and other than the traveling path of the subject vehicle, based on the input information. In the following explanation, various information input from the ranging sensor 140 and the camera 150 will be referred to as information on the dynamic traveling path boundaries. In other words, the traversable area generating unit 183 acquires information on the dynamic traveling path boundaries from the ranging sensor 140 and the camera 150 that detect the surrounding environment of the subject vehicle. The dynamic traveling path boundary information may be only information input from the ranging sensor 140.

The dynamic traveling path boundaries comprise information about the objects detected by the ranging sensor 140 and/or the objects imaged by the camera 150. The dynamic traveling path boundaries are traveling path boundaries according to the surrounding environment of the subject vehicle. The dynamic traveling path boundaries include, for example, road surface markings, road structures, and obstacles. The dynamic traveling path boundaries of road surface markings include, for example, lane boundaries, center lines. The dynamic traveling path boundaries of road structures include, for example, median strips, guardrails, curbs, tunnels, or side walls of highways. The dynamic traveling path boundaries of obstacles include, for example, other vehicles, motorcycles, and bicycles.

The traversable area generating unit 183 can distinguish the dynamic traveling path boundaries into first dynamic traveling path boundaries and second dynamic traveling path boundaries according to the type of the dynamic traveling path boundaries. The first dynamic traveling path boundaries are the dynamic traveling path boundaries of road surface markings. The first dynamic traveling path boundaries include, for example, lane boundaries and center lines, or the like. The second dynamic traveling path boundaries are the dynamic traveling path boundaries of road structures and/or objects (obstacles) existing around the subject vehicle. The second dynamic traveling path boundaries include, for example, median strips, guardrails, curbs, other vehicles, motorcycles, bicycles, or the like.

The traversable area generating unit 183 generates the travelable area of the subject vehicle based on the dynamic traveling path boundary information. For example, when the lane on which the subject vehicle travels is defined by the left and right lane boundaries (white lines), the traversable area generating unit 183 identifies the white line on the left side and the white line on the right side as the dynamic traveling path boundaries. Then, the traversable area generating unit 183 generates an area located between the white line on the left side and the white line on the right side as the traversable area of the subject vehicle. In the above example, when there is a parked vehicle in front on the left side relative to the traveling direction of the subject vehicle, the traversable area generating unit 183 identifies the side of the parked vehicle and the white line on the right side detected by the ranging sensor 140 as the dynamic traveling path boundaries. Then, the traversable area generating unit 183 generates an area, excluding the area occupied by the parked vehicle, in which the subject vehicle can overtake the parked vehicle as the traversable area. Thus, the dynamic traveling path boundaries differ from the static traveling path boundaries in that the dynamic traveling path boundaries change according to the surrounding environment of the subject vehicle. In addition, since the dynamic traveling path boundaries are based on the information detected by the ranging sensor 140 which has a limited detection range and/or the information imaged by the camera 150 which has a limited imaging range, the information on the dynamic traveling path boundaries is limited to information on the traveling path boundaries existing within the detection range of the ranging sensor 140 and/or information on the traveling path boundaries existing within the imaging range of the camera 150. In contrast, since the static traveling path boundaries are based on map information, the information on the static traveling path boundaries includes information on the traveling path boundaries existing outside the detection range of the ranging sensor 140 and/or outside the imaging range of the camera 150. The information of the traversable area generated by the traversable area generating unit 183 is output to the dynamic traveling path generating unit 184.

Next, the function of the dynamic traveling path generating unit 184 will be described. The dynamic traveling path generating unit 184 generates a traveling path corresponding to the surrounding environment of the subject vehicle as the dynamic traveling path. The dynamic traveling path is a traveling path which is different from a static traveling path and reflects the current surrounding environment of the subject vehicle. In other words, the dynamic traveling path is a traveling path to minimize risks that may occur depending on the surrounding environment of the subject vehicle. Such risks include, for example, risks that the subject vehicle travels outside of the lane boundaries, risks that the subject vehicle approaches obstacles existing on the road, or the like. As shown in FIG. 2, the information on the static traveling path from the static traveling path generating unit 182 and the information of the traversable area from the traversable area generating unit 183 are input to the dynamic traveling path generating unit 184, respectively. The dynamic traveling path generating unit 184 generates the dynamic traveling path using the various input information and outputs the dynamic traveling path information to the path combining unit 185.

Figure 4:
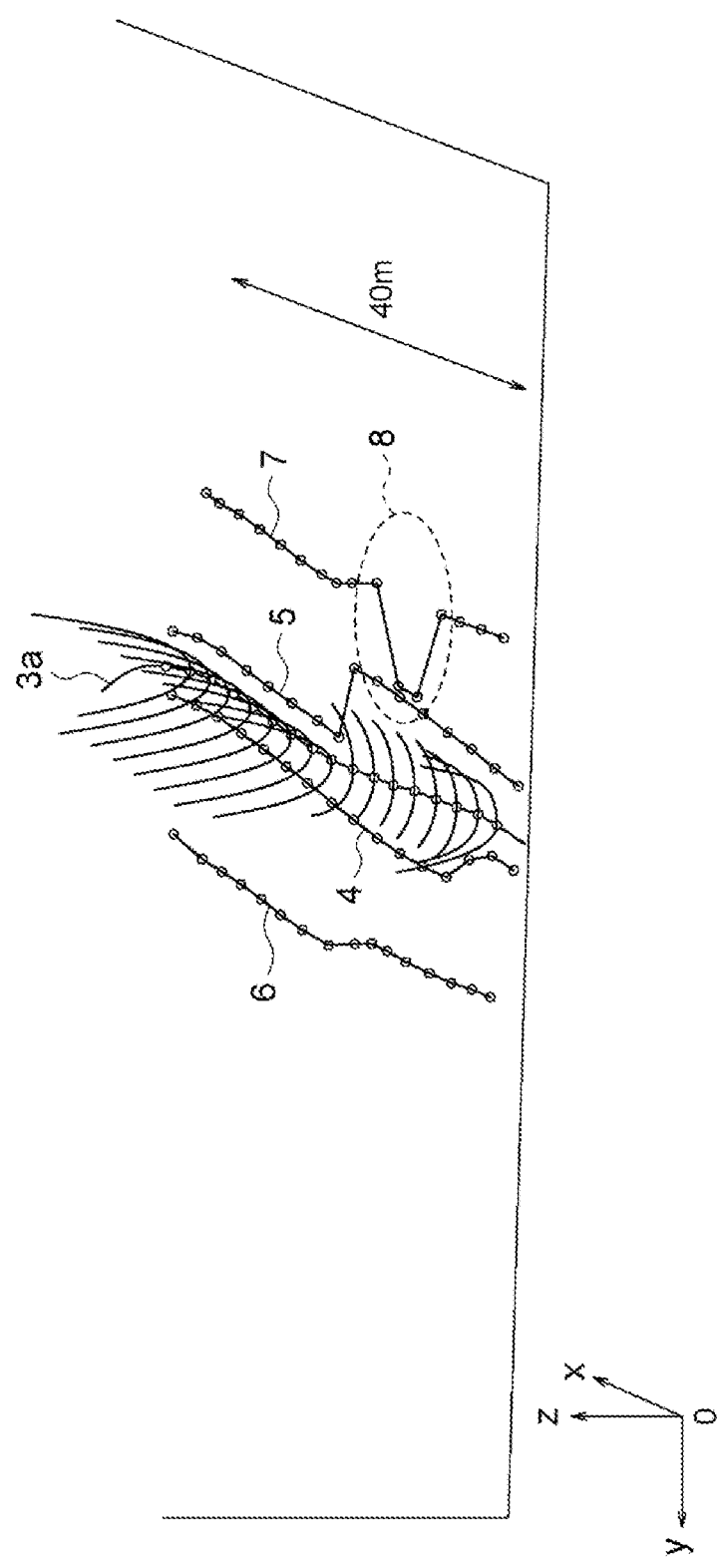
FIG. 4 is a diagram for explaining various kinds of information used for generating a dynamic traveling path.

FIG. 4 is a diagram for explaining various kinds of information used for generating the dynamic traveling path. Various information shown in FIG. 4 is information input to the dynamic traveling path generating unit 184 when the subject vehicle is traveling at the position P in FIG. 3. The x-axis and y-axis shown in FIG. 4 corresponds to the x-axis and y-axis shown in FIG. 3. In FIG. 4, symbol "3*a*" corresponds to the static traveling path 3 shown in FIG. 3. The static traveling path 3*a* is a traveling path that the static traveling path 3 has been corrected by the dynamic traveling path generating unit 184. In FIG. 4, symbols "4" and "5" denote white lines (first dynamic traveling path boundaries) defining a lane on which the subject vehicle travels, symbols "6" and "7" denote road structures (second dynamic traveling path boundaries) such as road shoulders or guardrails, and symbol "8" denotes a parked vehicle (second dynamic traveling path boundary). Incidentally, in FIG. 4, the dynamic traveling path boundaries 4 to 8 are displayed as point data detected by the ranging sensor 140, but the display form of the dynamic traveling path boundaries is not limited to point data. In addition, in FIG. 4, the dynamic traveling path boundaries themselves are shown instead of the traversable area, but the dynamic traveling path generating unit 184 may generate the dynamic traveling path using the information of the traversable area. The correction of the static traveling path will be described later.

Methods for generating the dynamic traveling path using the various kinds of information shown in the examples in FIG. 4 will be described. First, the dynamic traveling path generating unit 184 identifies the dynamic traveling path boundaries 4 to 8 based on the information input from the ranging sensor 140 and the camera 150. The dynamic traveling path boundaries 4 to 8 are information indicating the surrounding environment of the subject vehicle when the subject vehicle travels at the position P shown in FIG. 3.

Next, the dynamic traveling path generating unit 184 sets path length of the dynamic traveling path. In the present embodiment, the dynamic traveling path generating unit 184 sets the path length of the dynamic traveling path shorter than the path length of the static traveling path shown in FIG. 3. This is based on the viewpoint that the dynamic traveling path boundaries 4 to 8 shown in FIG. 4 change with time because the surrounding environment of the subject vehicle changes with time. For example, the dynamic traveling path generating unit 184 sets the path length of the dynamic traveling path to include all of the dynamic traveling path within the smaller of the detectable range of the ranging sensor 140 and the imageable range of the camera 150. In the example in FIG. 4, the dynamic traveling path generating unit 184 sets the path length of the dynamic traveling path to 40 meters.

The dynamic traveling path generating unit 184 generates a dynamic traveling path using, for example, an evaluation function which is a quadratic convex function, and the Newton method. The dynamic traveling path generating unit 184 sets the evaluation function satisfying the following equations (3) and (4) as the dynamic traveling path.

[Equation 3] (3)

$$J = \frac{1}{2}a_s\left(\left(\Sigma_i(u(i) - y_{si})^2 + \Sigma_i(u(i) - y_{sr})^2\right)\right) + $$
$$\frac{1}{2}a_k\left(\left(\Sigma_i(u(i) - y_{hi})^2 + \Sigma_i(u(i) - y_{hr})^2\right)\right) + $$
$$\frac{1}{2}a_{lp}\Sigma_i(u(i) - y_{lp})^2 + \frac{1}{2}k_p\Sigma_i(\rho(u(i)))^2$$

[Equation 4] (4)

$$\frac{\partial J}{\partial u} = 0$$

However, in the above equations (3) and (4), symbol "J" denotes the evaluation function (the dynamic traveling path) and symbol "u (i)" denotes the traveling distance of the subject vehicle from the centerline of the traveling path at each point. Symbol "$a_s$" denotes a weighting factor (e.g., $a_s$=1) indicating the magnitude of the influence of the first dynamic traveling path boundaries on the dynamic traveling path, symbol "$y_{sl}$" denotes the distance between the first dynamic traveling path boundary on the left side and the centerline of the traveling path, and symbol "$y_{sr}$" denotes the distance between the first dynamic traveling path boundary on the right side and the centerline of the traveling path. Symbol "$a_h$" denotes a weighting factor (e.g., $a_h$=10) indicating the magnitude of the influence of the second dynamic traveling path boundaries on the dynamic traveling path, symbol "$y_{hl}$" denotes the distance between the second dynamic traveling path boundary on the left side and the centerline of the traveling path, and symbol "$y_{hr}$" denotes the distance between the second dynamic traveling path boundary on the right side and the centerline of the traveling path. Symbol "$a_{lp}$" denotes a weighting factor (e.g., $a_{lp}$=0.1) indicating the magnitude of the influence of the static traveling path on the dynamic traveling path, symbol "$y_{hp}$" denotes the distance between the centerline of the traveling path and the static traveling path. Symbol "$k_\rho$" denotes a weighting factor indicating the magnitude of the influence of the curvature-mitigating factor on the first dynamic traveling path. It is possible to set the allowable curvature according to the vehicle speed by setting a variable value according to the vehicle speed. Symbol "ρ" denotes the curvature.

In the above equations (3) and (4), the weighting factor $a_s$, the weighting factor $a_h$, and the weighting factor $a_{lp}$ are predetermined by the control device 180 to satisfy a relationship between "the weighting factor $a_h$>the weighting factor $a_s$>the weighting factor $a_{lp}$".

The dynamic traveling path generating unit 184 calculates u (i) satisfying the above equation (4), and sets the evaluation function J when the calculated u (i) is substituted into the above equation (3) as the dynamic traveling path. The method for generating the centerline of the traveling path is described previously.

Returning again to FIG. 2, the functions realized by the control device 180 will be described. The function of the path combining unit 185 will be described. The path combining unit 185 generates a target traveling path of the subject vehicle by combining the dynamic traveling path and the static driving path. The target traveling path of the subject vehicle is a traveling path for the subject vehicle to travel smoothly while adjusting to the surrounding environment. The target traveling path is a traveling path extending along the dynamic traveling path from the current position of the subject vehicle and along the static traveling path after the end point of the dynamic traveling path. In other words, the target traveling path is a traveling path that is a combination of the dynamic traveling path and the static traveling path.

As shown in FIG. 2, the information on the static traveling path from the static traveling path generating unit 182 and the information on the dynamic traveling path from the dynamic traveling path generating unit 184 are input to the path combining unit 185, respectively. The path combining unit 185 combines the static traveling path and the dynamic traveling path so that the end point of the dynamic traveling path (also called the terminal of the dynamic traveling path) is placed on the static traveling path. The path (the target traveling path) combined by the path combining unit 185 is output to the path following unit 186.

Figure 5:
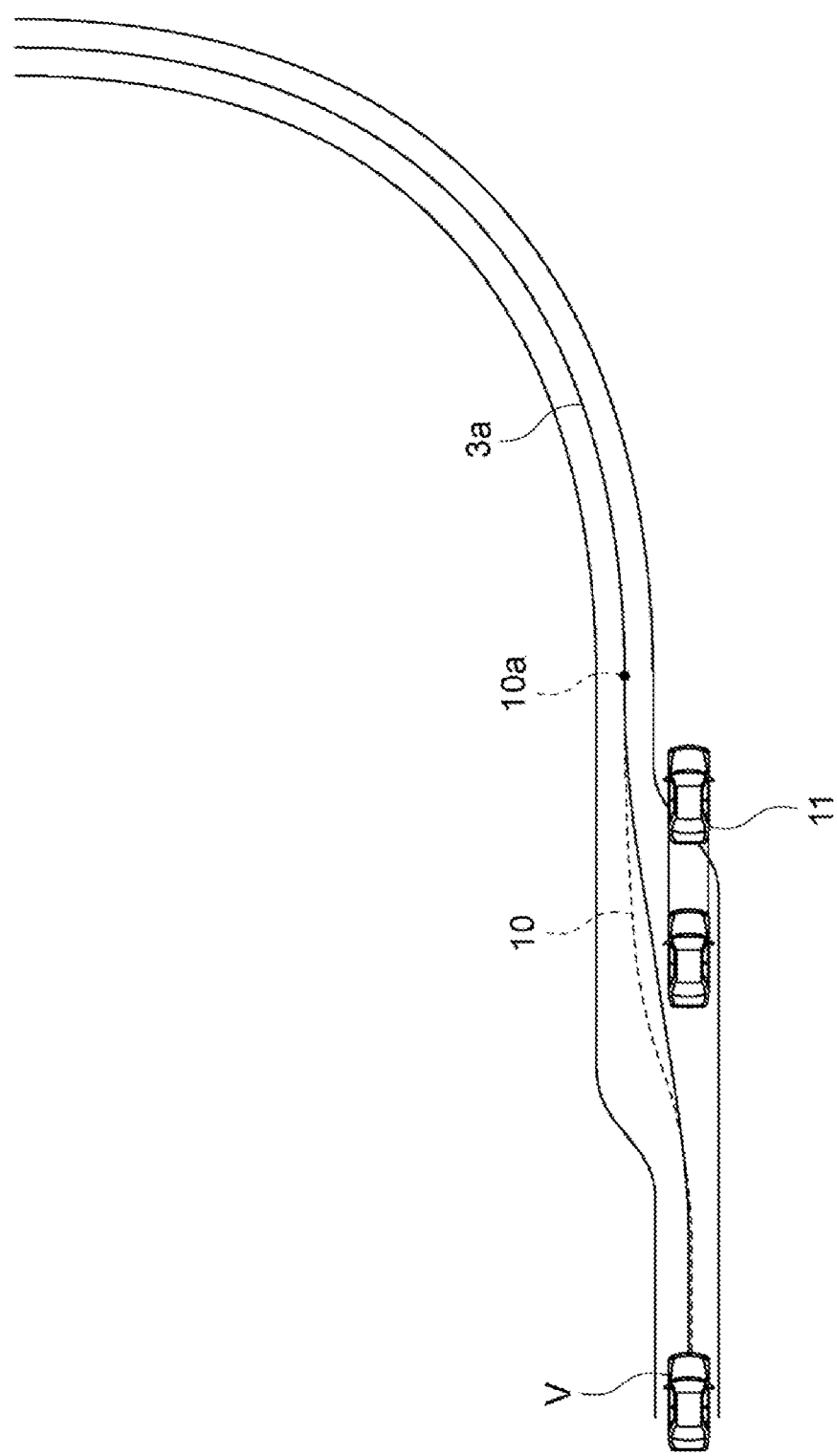
FIG. 5 is a diagram for explaining how the static traveling path and the dynamic traveling path are combined.

FIG. 5 is a diagram for explaining how the static traveling path and the dynamic traveling path are combined. In FIG. 5, symbol "3a" corresponds to the static traveling path 3 shown in FIG. 3. The static traveling path 3a is a path that the static traveling path 3 has been corrected by the path combining unit 185. In FIG. 5, symbol "10" denotes the dynamic traveling path and symbol "11" denote the parked vehicle (obstacle), respectively. The correction of the static traveling path will be described later.

As shown in FIG. 5, the path combining unit 185 combines the dynamic traveling path 10 and the static traveling path 3a so that the end point 10a of the dynamic traveling path 10 is placed on the static traveling path 3a. In this way, the target traveling path is generated, which is a combination of the dynamic traveling path 10 for avoiding the obstacle 11 and the static driving path 3a for the vehicle to travel smoothly through curves.

Returning to FIG. 2, the function of the path following unit 186 will be described. The path following unit 186 performs automatic driving control that automatically performs all or part of the traveling of the subject vehicle so that the subject vehicle travels on the target traveling path by controlling the drive mechanism 170. The path following unit 186 calculates a control command value to follow the target traveling path, and outputs the control command value to the drive mechanism 170. The control command value includes, for example, a steering angle command value for controlling the steering angle of the subject vehicle. The path following unit 186 can also perform a path following process (e.g., feedback control) known at the time of filing this application.

Figure 6:
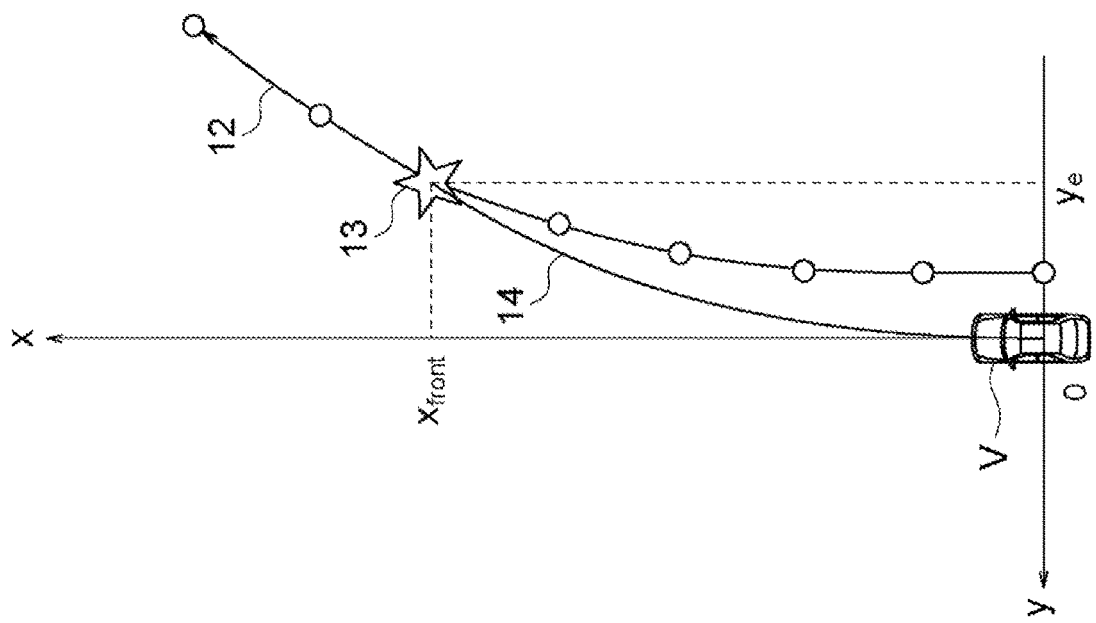
FIG. 6 is a diagram for explaining an exemplary method of calculating a control command value.

FIG. 6 is a diagram for explaining an exemplary method of calculating the control command value. In FIG. 6, symbol "12" denotes a target traveling path, symbol "13" denotes a gazing point ($x_{front}$, $y_e$) on the target traveling path set by the forward gazing model, and symbol "14" denotes a circle in contact with the origin O and the gazing point 13. The x-axis and y-axis shown in FIG. 6 correspond to the x-axis and y-axis shown in FIG. 3. Incidentally, the forward gazing model is a predetermined model that models the forward point that the driver gazes at when he or she is driving. In the example of FIG. 6, the subject vehicle V is assumed to be located at the origin O.

For example, the path following unit 186 calculates the curvature of the circle 14 using the following equation (5) in order to make the subject vehicle travel along the target traveling path. Then, the path following unit 186 calculates the steering angle command value for traveling the subject vehicle along the target traveling path 12 based on the curvature of the circle 14 shown in FIG. 6.

[Equation 5]

$$\rho = \frac{2y_e}{x_{front}^2 + y_e^2} \quad (5)$$

However, in the above equation (5), symbol "ρ" denotes the curvature of the circle 14, symbol "$x_{front}$" denotes the x-axis coordinate at the gazing point 13, and symbol "$y_e$" denotes the y-axis coordinate at the gazing point 13.

Figure 7:
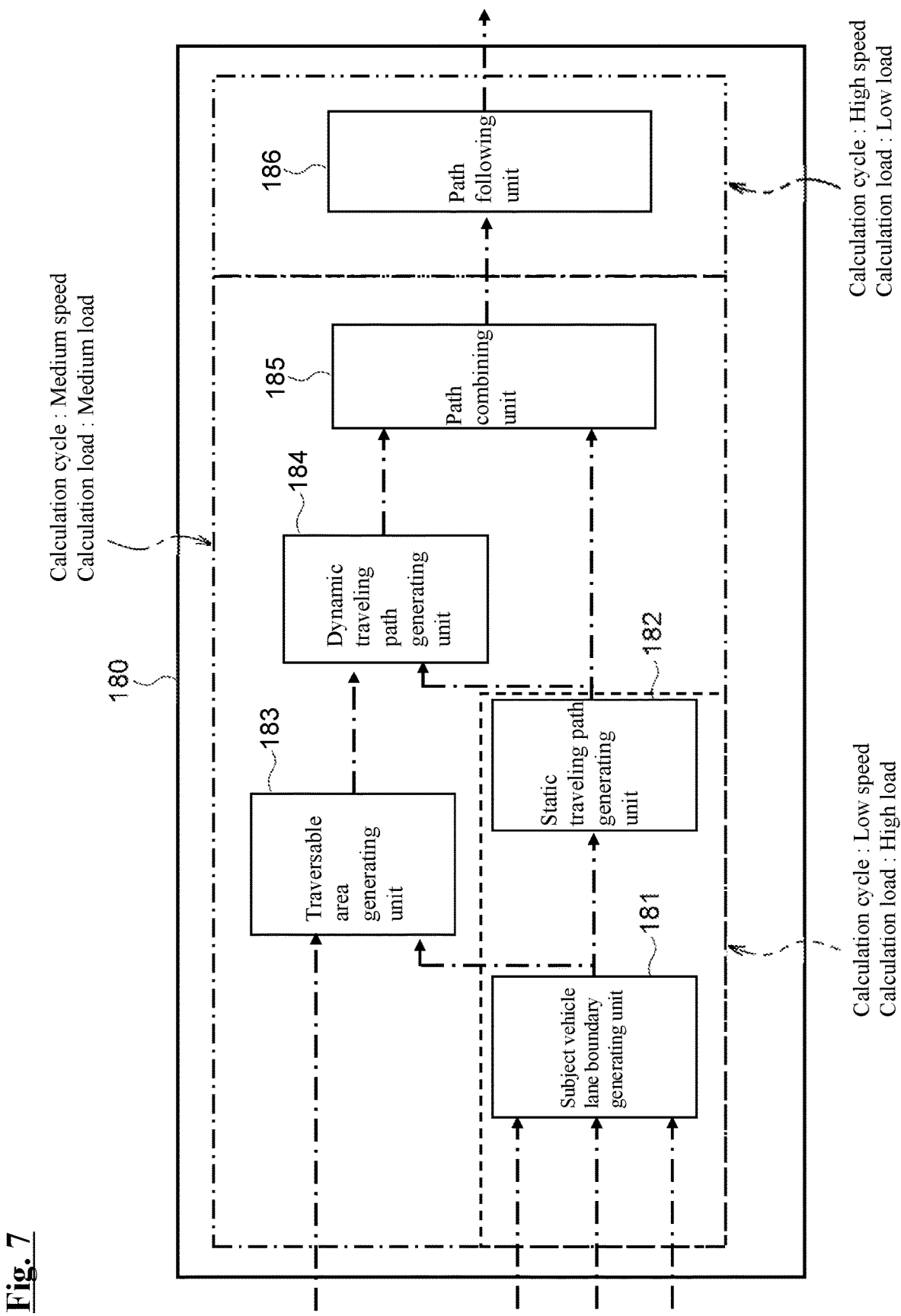
FIG. 7 is a diagram for explaining a calculation cycle and a calculation load of the processor in each process of the control device.

Next, a calculation cycle and a calculation load of the processor in each process will be described with reference to FIG. 7. FIG. 7 is a diagram for explaining a calculation cycle and a calculation load of the processor in each process of the control device 180. Since FIG. 7 corresponds to FIG. 2, the description of the function of each block shown in FIG. 7 is based on the previous description.

As shown in FIG. 7, the calculation cycle of the processor (also referred to as arithmetic processing time) can be divided into three categories: high speed, medium speed, and low speed, depending on the block of the control device 180. Specifically, the calculation cycle of the processor in the process of generating the static traveling path is longer than the calculation cycle of the processor in the process of generating the dynamic traveling path and the calculation cycle of the processor in the process of calculating the control command value. In addition, the calculation cycle of the processor in the process of generating the dynamic traveling path is longer than the calculation cycle of the processor in the process of calculating the control command value.

As shown in FIG. 7, the calculation load of the processor can be divided into three categories: high load, medium load, and low load, depending on the block of the control device 180. Specifically, the calculation load of the processor in the process of generating the static traveling path is higher than the calculation load of the processor in the process of generating the dynamic traveling path and the calculation load of the processor in the process of calculating the control command value. In addition, the calculation load of the processor in the process of the dynamic traveling path is higher than the calculation load of the processor in the process of calculating the control command value.

In the blocks related to the static traveling path (the subject vehicle lane boundary generating unit 181 and the static traveling path generating unit 182), the processor performs the process with a low-speed calculation cycle. It is preferred that the static traveling path which has a relatively long path length and reflects map information updated less frequency, is updated less frequently. The processor, for example, performs process related to the static traveling path with 2 Hz calculation cycle. On the other hand, since each process requires a huge amount of data such as map information, the calculation load of the processor is high.

As shown in FIG. 7, in the blocks related to the dynamic traveling path (the traversable area generating unit 183, the dynamic traveling path generating unit 184, and the path combining unit 185), the processor performs process with a medium-speed calculation cycle. It is preferred that the dynamic traveling path which needs to be updated according to the surrounding environment of the subject vehicle and has a relatively short path length, is updated slightly more frequently. The processor, for example, performs the process related to the dynamic traveling path with 10 Hz calculation cycle. On the other hand, since each processes require slightly larger data such as the detection results detected by the ranging sensor 140 and the captured images of the camera 150, the calculation load of the processor is slightly higher.

As shown in FIG. 7, in the block related to the path following (the path following unit 186), the processor performs the process with a high-speed calculation cycle. It is preferred that the path following process which requires feedback control, is updated more frequently. The processor, for example, performs the process related to the path following with 10 Hz calculation cycle. On the other hand, since each process requires only a relatively small data such as the forward gazing model, the calculation load of the processor is small.

As described above, in the present embodiment, by assigning the calculation cycle to each block in accordance with the calculation load, it is possible to prevent, for example, the static traveling path with a high calculation load from being updated with high frequency, thereby reducing the calculation load of the entire control device 180.

Figure 8A:
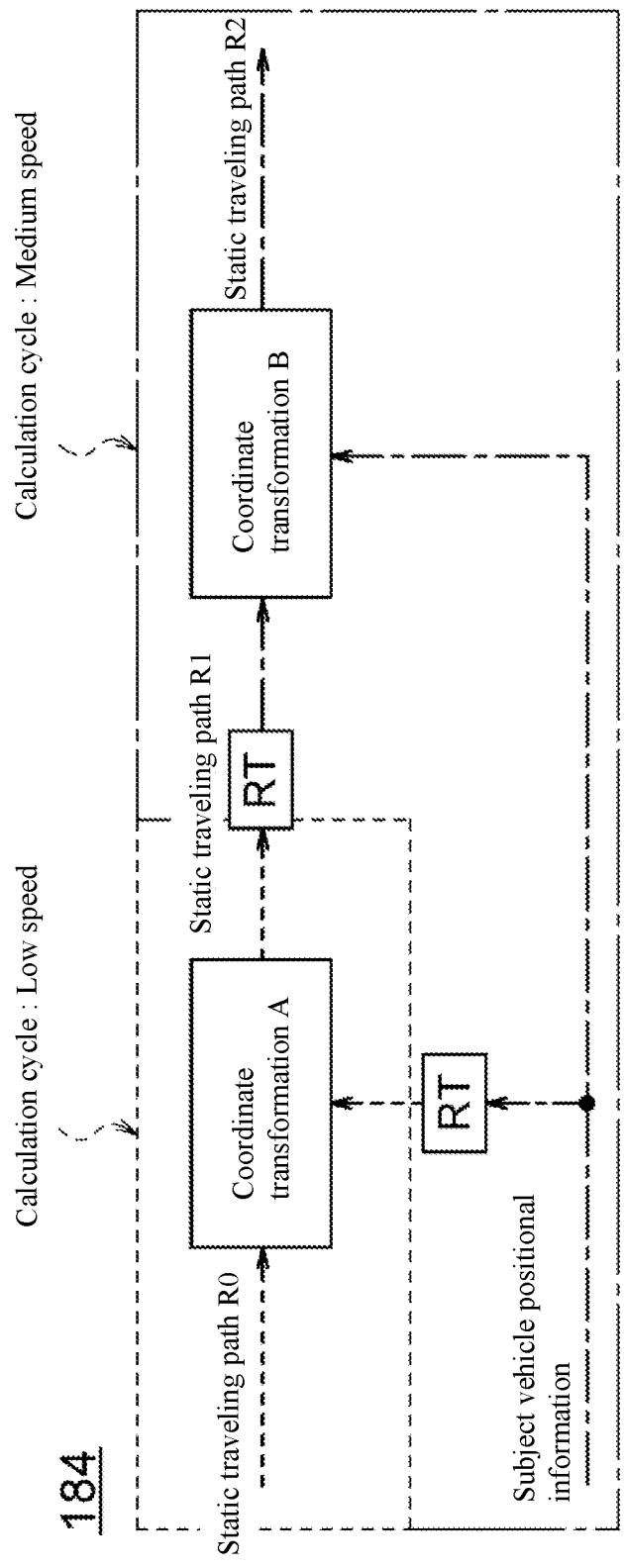
FIG. 8A is a diagram for explaining a correction process to a static traveling path.
Figure 8B:
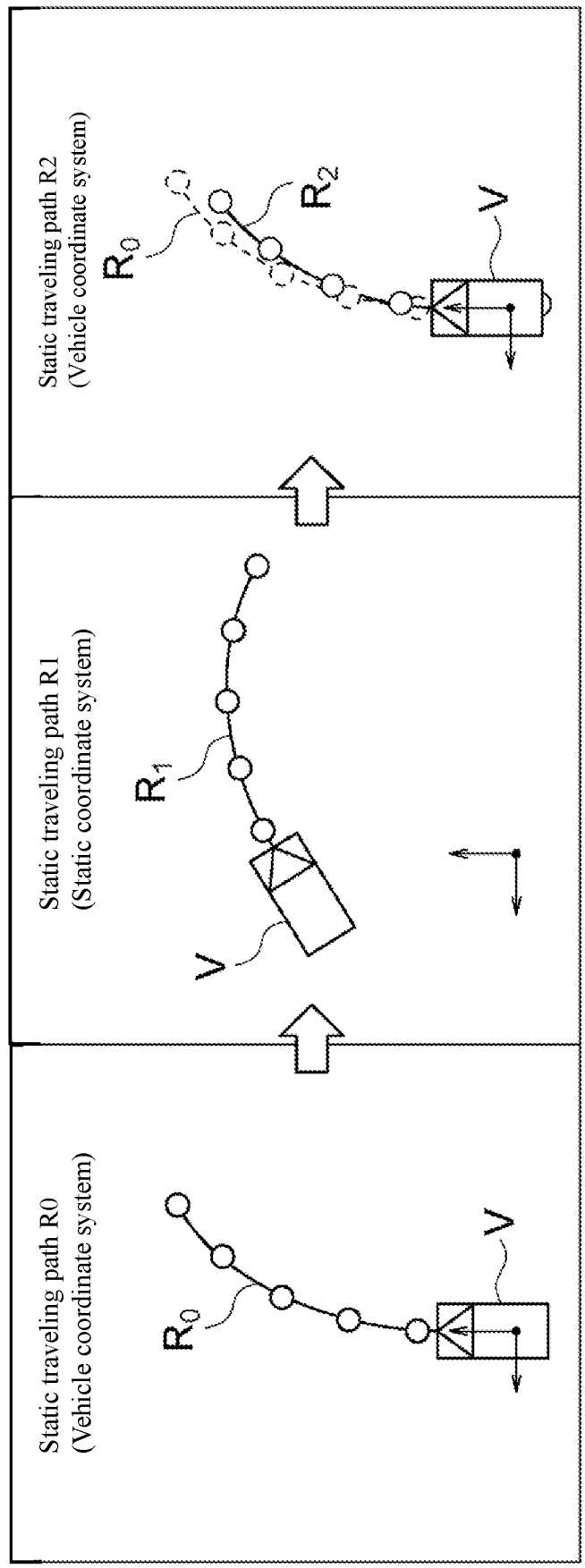
FIG. 8B is a diagram of each static traveling path in each block shown in FIG. 8A.

Next, a correction process for the static traveling path executed by the dynamic traveling path generating unit 184 and the path combining unit 185 will be described with reference to FIG. 8A and FIG. 8B. In the following explanation, the same process can be executed in the path combining unit 185. FIG. 8A is a diagram for explaining a correction process for the static traveling path, and FIG. 8B is a diagram of each static traveling path in each block shown in FIG. 8A.

The dynamic traveling path generating unit 184 corrects the static traveling path by reflecting the travel distance of the subject vehicle during a period for which the dynamic traveling path is generated in the static traveling path. Specifically, first, the dynamic traveling path generating unit 184 estimates the position of the subject vehicle on the map based on the map information and the detection results of the ranging sensor 140. Then, as shown in FIG. 8A, the dynamic traveling path generating unit 184 performs a coordinate transformation process to transform a coordinate defining the static traveling path from a coordinate system centered on the position of the subject vehicle to a coordinate system centered on the position on the map, based on the estimated position of the subject vehicle on the map. The coordinate system centered on the position of the subject vehicle is also referred to as a vehicle coordinate system. The coordinate system centered on the position on the map is also referred to as a static coordinate system.

In FIG. 8A, the coordinate transformation from the vehicle coordinate system to the static coordinate system corresponds to the coordinate transformation A. In FIG. 8B, the static traveling path which is defined in the vehicle coordinate system and is updated with the calculation cycle (low speed) of the processor in the static traveling path generation process, is shown by the static traveling path $R_0$.

The dynamic traveling path generating unit 184 performs a coordinate transformation process from the vehicle coordinate system to the static coordinate system for the static traveling path, and in the subsequent process, processes the static traveling path with the processor's calculation cycle (medium speed) of the process of generating the dynamic traveling path. In this way, the updating frequency of the static traveling path is changed from the calculation cycle (low speed) of the processor in the process of generating the static traveling path to the calculation cycle (medium speed) of the processor in the process of generating the dynamic traveling path. In FIG. 8B, the static traveling path which is defined in the static coordinate system and is updated with the calculation cycle of the processor in the process of generating the dynamic traveling path, is shown by the static traveling path $R_1$.

The dynamic traveling path generating unit 184 performs a coordinate transformation process to transform the coordinates defining the static traveling path from the static coordinate system to the vehicle coordinate system, based on the estimated position of the subject vehicle on the map. In FIG. 8B, the static traveling path which is defined by the vehicle coordinate system and is updated with the calculation cycle of the processor in the process of generating the dynamic traveling path, is shown by the static traveling path $R_2$. The static traveling path $R_2$ is a traveling path that reflects the travel distance of the subject vehicle relative to the static traveling path $R_0$.

Figure 9:
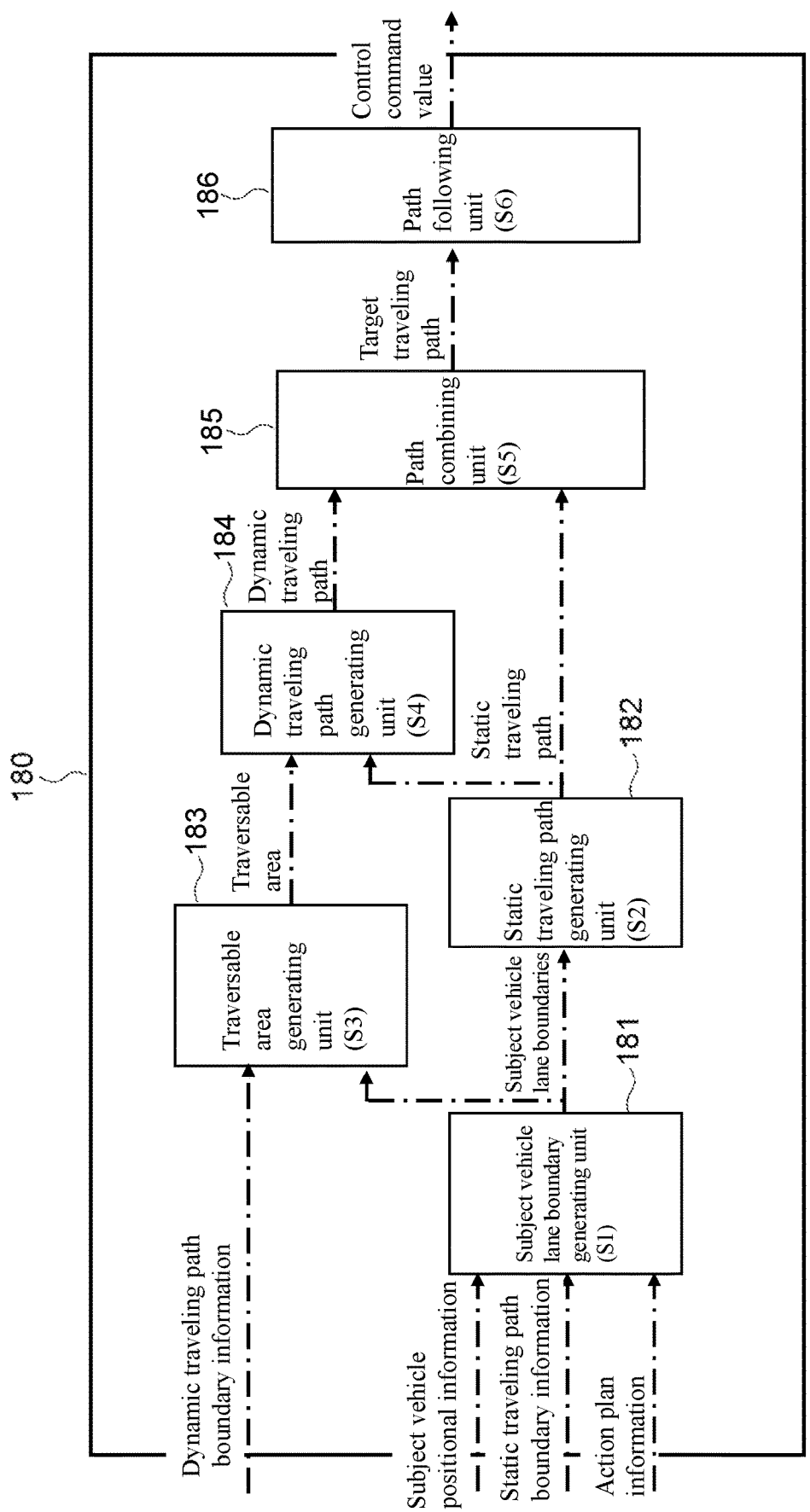
FIG. 9 is a block diagram illustrating a flow of the control process of the present embodiment.

Next, a control process to assist the vehicle's traveling will be described. FIG. 9 is a block diagram illustrating a flow of the control process of the present embodiment. The traveling control process described below is performed by the control device 180. Further, the traveling control process described below starts when the ignition switch or power switch is turned on and is performed repeatedly at a predetermined cycle (e.g., every 10 milliseconds) until the ignition switch or power switch is turned off. The calculation cycle of the processor in each step shown in FIG. 9 satisfies the relationship of the calculation cycle of the processor in each block shown in FIG. 7.

In step S1, the control device 180 generates subject vehicle lane boundaries. For example, the control device 180 acquires the current positional information of the subject vehicle from the subject vehicle position detecting device 110, acquires the information on the static traveling path boundaries from the map database 120, and acquires the information of the action plan from the navigation system. The control device 180 generates the subject vehicle lane boundaries which indicate boundaries between the subject vehicle lane and other than the subject vehicle lane, based on input information.

In step S2, the control device 180 generates the static traveling path based on the information on the subject vehicle lane boundaries generated in step S1. First, the control device 180 sets the path length of the static traveling path. For example, the control device 180 sets the path length of the static traveling path to include at least two corners on the road on which the subject vehicle travels. Further, for example, the control device 180 sets the path length of the static traveling path to include a section of straight path for a predetermined distance or more. Next, the control device 180 generates, for example, a traveling path in which a change of lateral acceleration applied to the subject vehicle is minimized when the vehicle travels on a traveling path on the map, as a static traveling path. For example, the control device 180 generates a static traveling path using an evaluation function which is a quadratic convex function and Newton method.

In step S3, the control device 180 generates a traversable area. For example, the control device 180 acquires information on the dynamic traveling path boundaries from the ranging sensor 140 and the camera 150 and recognizes the dynamic traveling path boundaries. The control device 180 generates an area which is defined by the dynamic traveling boundaries and on which the subject vehicle can travel, as a traversable area.

In step S4, the control device 180 generates a dynamic traveling path. The control device 180 generates a traveling path corresponding to the surrounding environment of the subject vehicle as the dynamic traveling path based on the static traveling path generated in Step S2 and the traversable area generated in Step S3. Incidentally, the control device 180 performs the correction process for the static traveling path with different update frequency, and generates the dynamic traveling path using the corrected static traveling path.

In step S5, the control device 180 generates a target traveling path by combining the dynamic traveling path and the static traveling path. The control device 180 generates the target traveling path comprising the dynamic traveling path and the static traveling path, based on the static traveling path generated in Step S2 and the dynamic traveling path generated in Step S4. The control device 180 combines the dynamic traveling path and the static traveling path so that the end point of the dynamic traveling path is placed on the static traveling path.

In step S6, the control device 180 generates a control command value to travel the subject vehicle along the target traveling path. The control device 180 generates the control command value (e.g., a steering angle command value) based on the target traveling path generated in Step S5. After the control command value is generated by the control device 180, the control device 180 finishes the control process shown in FIG. 9.

As described above, in the present embodiment, the control device 180 acquires the information on the static traveling path boundaries between a traveling path of the subject vehicle and other than the traveling path of the subject vehicle from the map database 120 that stores the map information, and acquires the information on the dynamic traveling path boundaries different from the static traveling path boundaries from the ranging sensor 140 and the camera 150 that detect the surrounding environment of the subject vehicle. Then, the control device 180 generates a static traveling path on which the subject vehicle can travel based on the information on the static traveling path boundaries, and generates an dynamic traveling path which is shorter than the static traveling path and corresponds to the surrounding environment of the subject vehicle based on the information on the static traveling path and the dynamic traveling path boundaries. The control device 180 controls the subject vehicle to travel the subject vehicle along the target traveling path including the static traveling path and the dynamic traveling path. Since the dynamic traveling path corresponds to the surrounding environment of the subject vehicle and is based on the static traveling path for smooth traveling of the subject vehicle, it is possible to make a traveling plan that is compatible with both corresponding to the surrounding environment and traveling smoothly.

Further, in the present embodiment, since the information on the static traveling path boundaries also includes information on positions far from the subject vehicle, so it has an advantage that it can be used to generate a long-range smooth path which takes into account the next traveling situations. On the other hand, the information on the static traveling path boundaries does not include information on dynamic surrounding situations, and is not suitable for traveling according to the dynamic surrounding environment. Therefore, in order to compensate for the dynamic surrounding situations, in the present embodiment, the dynamic traveling path corresponding to the surrounding environment of the subject vehicle is generated based on the information on the dynamic traveling path boundaries. In addition, if a traveling path is generated using only the information on the dynamic traveling path boundaries, the traveling path with sharp changes will be generated, and traveling on this traveling path may cause discomfort to the occupants of the subject vehicle. Therefore, in the present embodiment, in order to suppress the discomfort caused to the occupants, the dynamic traveling path is generated by using the static traveling path characterized by smoothness, not limited to the information on the dynamic traveling path boundaries. This enables traveling in accordance with the dynamic surrounding environment, which is difficult to achieve using only the information on the static traveling path boundaries.

In addition, in the present embodiment, the information on the dynamic traveling path boundaries includes the information on the dynamic surrounding situations, and the traveling path can be generated based on the information on the dynamic traveling path boundaries, and the traveling can be adapted to the dynamic surrounding environment by traveling on the traveling path. However, since the information on the dynamic traveling path boundaries is limited to the detection range of the sensor of the subject vehicle, it is unsuitable for acquiring the information on positions far from the subject vehicle and generating a traveling path take into account situations in positions far from the subject vehicle. Therefore, in the present embodiment, the static traveling path generated using the information outside the detection range of the sensor detecting the dynamic traveling path boundaries in addition to the dynamic traveling path boundaries, is also considered. This enables a traveling path to be generated that takes into account the situations outside the detection of the sensor, i.e., far away from the subject vehicle.

In the present embodiment, the dynamic traveling path which is shorter than the static traveling path is generated. By generating a long-range traveling path, it is possible to generate a smooth path in the long range, taking into account the next traveling situation. However, on the other hand of its advantage, calculating the long-range path is a high calculation load. The calculating the traveling path for the same length as the static traveling path based on the information on the dynamic traveling path boundaries is also a high calculation load. Therefore, in the present embodiment, the calculation load for generating the dynamic traveling path can be suppressed by generating a dynamic traveling path which is shorter than the static traveling path.

In the present embodiment, the information on the static traveling path boundaries includes information outside the detection range of the sensor for detecting the dynamic traveling path boundaries, and the static traveling path is generated using information outside the detection range of the sensor for detecting the dynamic traveling path boundaries. Generation of static traveling path using the information on the static traveling path boundaries generally uses data stored in memory or data already stored in the cloud. Thus, information outside the detection range of the sensor can be acquired stably, and a long-range static traveling path can be generated. On the other hand, since the information on the dynamic traveling path boundaries is based on the information detected by the sensor, it is limited to the information within the detection range of the sensor. Since the information on the dynamic traveling path boundaries includes information which is information in the vicinity of the subject vehicle, which is not included in the information on the static traveling path boundaries (e.g., dynamic object information), it is possible to adapt to the surrounding environment by acquiring the information on the dynamic traveling path boundaries and generating the dynamic traveling path based on the information on the dynamic traveling path.

In the present embodiment, the information on the static traveling path boundaries includes information on a traveling lane on which the subject vehicle is traveling and information on a traveling scheduled lane which is different from the traveling lane and on which the subject vehicle is scheduled to travel, and the static traveling path is generated by using the information on the traveling lane on which the vehicle is traveling and the information on the traveling scheduled lane which is different from the traveling lane and on which the subject vehicle is scheduled to travel. For example, when the subject vehicle joins a merged lane or when the subject vehicle turns right and left, the static traveling path can be generated by taking into account not only the traveling lane where the subject vehicle is currently traveling, but also the situations of the lane after joining or turning right or left. This enables a smoother traveling path to be generated.

In the present embodiment, the control device 180 calculates the control command value for traveling the subject vehicle along the target traveling path and controls the subject vehicle based on the control command value. This enables the subject vehicle to travel smoothly while corresponding to the surrounding environment.

In the present embodiment, the control device 180 generates the target traveling path by combining the dynamic traveling path and the static traveling path so that the end point of the dynamic traveling path is placed on the static traveling path. Thus, even when combining the traveling paths generated based on different information, it is possible to suppress occurrence of discontinuous point of curvature at the combined point. As a result, it is possible to smoothly travel the subject vehicle along the target traveling path.

In the present embodiment, the calculation cycle of the processor in the process of generating the static traveling path is longer than the calculation cycle of the processor in the process of generating the dynamic traveling path. This enables the dynamic traveling path to be updated with a short cycle to adapt conditions around the subject vehicle that are dynamically changing, thereby making it possible to travel the subject vehicle in response to the surrounding environment.

In general, the information on the static traveling path boundaries is not changed dynamically and is stable as information. Therefore, even if the static traveling path is updated at high frequency, the shape of the static traveling path does not change significantly. However, since the subject vehicle moves even while the subject vehicle is controlled based on the static traveling path and the dynamic traveling path, the position of the subject vehicle has changed since the last time the static traveling path was calculated. Therefore, it is also necessary to generate a static traveling path starting from the position of the subject vehicle after movement (also referred to as a new position). Thus, even if the static traveling path is not calculated at high frequency, the static traveling path starting from the position of the subject vehicle after the movement is also required to be generated, and therefore, in the present embodiment, the calculation cycle of the processor in the process of generating the static traveling path is longer than the calculation cycle of the processor in the process of generating the dynamic traveling path. This enables a smooth static traveling path and eventually a dynamic traveling path to be generated while suppressing the calculation load for generating the static traveling path.

The calculation cycle of the processor in the process of generating the static traveling path is longer than the calculation cycle of the processor in the process of calculating the control command value. This enables the following control to be performed with higher followability to the generated traveling path because the control command value is updated more frequently. From the viewpoint of control stability, it is possible to improve the stability of the following control. The same effects can be obtained if the calculation cycle of the processor in the process of generating the static traveling path is longer than the calculation cycle of the processor in the process of generating the dynamic traveling path, and in addition, the calculation cycle of the processor in the process of generating the static traveling path is longer than the calculation cycle of the processor in the process of calculating the control command value.

The calculation cycle of the processor in the process of generating the dynamic traveling path is longer than the calculation cycle of the processor in the process of calculating the control command value. This enables the following control to be performed with higher followability to the generated traveling path because the control command value is updated more frequently. From the viewpoint of control stability, it is possible to improve the stability of the following control. The same effects can be obtained if the calculation cycle of the processor in the process of generating the static traveling path is longer than the calculation cycle of the processor in the process of generating the dynamic traveling path, and in addition, the calculation cycle of the processor in the process of generating the dynamic traveling path is longer than the calculation cycle of the processor in the process of calculating the control command value.

In addition, in the present embodiment, in the process of generating the dynamic traveling path, the control device 180 corrects the static traveling path by reflecting the travel distance of the subject vehicle during the period for which the dynamic traveling path is generated in the static traveling path. This enables the generation of the dynamic traveling path based on the information on the static traveling path corresponding to the current position of the subject vehicle, even when the update frequency of the static traveling path is lower than the update frequency of the dynamic traveling path. As a result, it is possible to improve the stability of the following control along the target traveling path.

Further, in the present embodiment, the control device 180 estimates the position of the subject vehicle on the map based on the map information and the detection results of the ranging sensor 140, and in the correction process of the static traveling path, performs the coordinate transformation process to transform a coordinate defining the static traveling path from the coordinate system centered on the position of the subject vehicle to the coordinate system centered on the position on the map based on the position of the subject vehicle on the map, and then corrects the static traveling path using the calculation cycle of the processor in the process of generating the dynamic traveling path. Since the correction process of the static traveling path is performed based on the high-precision map information, the accuracy of correcting the static traveling path can be improved.

Furthermore, in the present embodiment, the control device 180 generates a traveling path with a minimum change of curvature, as a static traveling path. This enables the subject vehicle to travel smoothly, regardless of the road shapes.

In addition, in the present embodiment, the path length of the static traveling path is longer than the path length of the dynamic traveling path. This enables, for example, a traveling plan to make the subject vehicle travel smoothly even in the range that is undetectable by the ranging sensor 140.

Further, in the present embodiment, the control device 180 sets the path length of the static traveling path to include at least two corners. Since the start point and the end point of the corner are included in the static traveling path, it is possible to suppress the occurrence of discontinuous points of curvature at the start point and the end point of the corner. As a result, the subject vehicle can be smoothly traveled along the target traveling path.

Furthermore, in the present embodiment, the control device 180 sets the path length of the static traveling path to include the section of the straight path for a predetermined distance or more after the corner. It is possible to suppress the occurrence of discontinuous points of curvature in the section between the straight path from the corner. As a result, the subject vehicle can be smoothly traveled along the target traveling path.

In addition, in the present embodiment, the control device 180 sets the path length of the dynamic traveling path so that the dynamic traveling path is included within the detection range of the ranging sensor 140. This enables the detection results of the ranging sensor 140 to be used in generating the dynamic traveling path. As a result, it is possible to generate the dynamic traveling path corresponding to the surroundings of the subject vehicle.

Further, in the present embodiment, the control device 180 identifies the dynamic traveling path boundaries which are road surface markings as the first dynamic traveling path boundaries, and identifies the dynamic traveling path boundaries which are obstacles existing around the subject vehicle as the second dynamic traveling path boundaries. This enables, for example, in the dynamic traveling path generation process, the degree of influence that the first dynamic traveling path boundaries have on the dynamic traveling path and the degree of influence that the second dynamic traveling path boundaries have on the dynamic traveling path to be changed. As a result, for example, it is possible to generate a dynamic traveling path that reflects traveling to avoid obstacles rather than traveling to avoid crossing the white line.

Further, in the present embodiment, the control device 180 generates the dynamic traveling path using a relationship in which the weighting factor $a_h$, the weighting factor $a_s$, and the weighting factor $a_{lp}$ decrease in that order. This enables the generation of a dynamic traveling path to avoid obstacles when obstacles are existing. When obstacles are not existing, it is possible to generate a dynamic traveling path to avoid crossing the white line. Regardless of the existence of obstacles, it is possible to generate a dynamic traveling path for smooth traveling. In other words, it is possible to drive the subject vehicle in accordance with the actual surrounding environment of the subject vehicle.

It should be appreciated that the embodiments explained heretofore are described to facilitate understanding of the present invention and are not described to limit the present invention. It is therefore intended that the elements disclosed in the above embodiments include all design changes and equivalents to fall within the technical scope of the present invention.

For example, in the above-described embodiment, the cases in which the dynamic traveling path generating unit 184 and the path combining unit 185 perform the correction process of the static traveling path (see FIG. 8A and FIG. 8B) has been described as an example, but, the path following unit 186 may perform the correction process of the target traveling path. In other words, in the calculation process of the control command value, the control device 180 may correct the target traveling path by reflecting the travel distance of the subject vehicle during the period for which the control command value is calculated in the target traveling path. This enables control command values to be calculated based on the information on the target traveling path corresponding to the current position of the subject vehicle, even when the update frequency of the target traveling path is lower than that of the control command value. As a result, it is possible to improve the stability of the following control along the target traveling path.

The control device 180 may estimate the position of the subject vehicle on the map based on the map information and the detection results of the ranging sensor 140, in the correction process of the target traveling path, based on the position of the subject vehicle on the map, perform the coordinate transformation process to transform the coordinate defining the target traveling path from the coordinate system centered on the position of the subject vehicle to the coordinate system centered on the position on the map, and then correct the target traveling path using the calculation cycle of the processor in the calculation process of the control command value. Since the target traveling path correction process is performed based on high-precision map information, the correction accuracy of the target traveling path can be improved.

Further, for example, in the above-described embodiment, as an example of the static traveling path, the traveling path in which the change of lateral acceleration of the subject vehicle is equal to or less than a predetermined value has been described, but the traveling path in consideration of the lateral acceleration of the subject vehicle is not limited to the static traveling path. For example, the dynamic traveling path generating unit 184 may generate a dynamic traveling path that minimizes a change of lateral acceleration applied to the subject vehicle when the vehicle travels along the traveling path on the map based on the information on the dynamic traveling path boundaries. This enables, for example, to smoothly avoid obstacles (e.g., pass through) when obstacles exist around the subject vehicle. In addition, when the subject vehicle travels at the combined point of the dynamic traveling path and the static traveling path, the lateral acceleration applied to the subject vehicle can be suppressed, and the traveling of the subject vehicle can be smoothly transitioned from the dynamic traveling path to the static traveling path. Similarly, it is possible to smoothly transition the traveling of the subject vehicle from the static traveling path to the dynamic traveling path. As a result, it is possible to suppress the discomfort caused to the occupants of the subject vehicle due to the difference in the traveling path.

DESCRIPTION OF REFERENCE NUMERALS

100 Travel assistance device
110 Subject vehicle position detecting device
120 Map database
130 Vehicle speed sensor
140 Ranging sensor
150 Camera
160 Input device
170 Drive mechanism
180 Control device (Processor)
190 Yaw rate sensor

The invention claimed is:

1. A travel assistance method for a vehicle to be executed by a processor, comprising:
   acquiring, from a device for storing map information, information on static traveling path boundaries between a traveling path of a subject vehicle and other than the traveling path;
   acquiring, from a sensor for detecting surrounding environment of the subject vehicle, information on dynamic traveling path boundaries different from the static traveling path boundaries;
   generating, based on the information on the static traveling path boundaries, a static traveling path on which the subject vehicle can travel;
   generating, based on the information on the static traveling path and the dynamic traveling path boundaries, a dynamic traveling path which is shorter than the static traveling path and corresponds to the surrounding environment; and
   controlling the subject vehicle to travel along a target traveling path including the static traveling path and the dynamic traveling path,
   wherein a calculation cycle of the processor in a process of generating the static traveling path is longer than a calculation cycle of the processor in a process of generating the dynamic traveling path.

2. The travel assistance method according to claim 1, wherein:
   the information on the static traveling path boundaries includes information outside a detection range of the sensor for detecting the dynamic traveling path boundaries, and
   the static traveling path is generated by using the information outside the detection range of the sensor for detecting the dynamic traveling path boundaries.

3. The travel assistance method according to claim 1, wherein:
   the information on the static traveling path boundaries includes information on a traveling lane on which the subject vehicle is travelling, and information on a traveling scheduled lane which is different from the traveling lane and on which the subject vehicle is scheduled to travel, and the static traveling path is generated by using the information on the traveling lane on which the subject vehicle is travelling, and the information on the traveling scheduled lane which is different from the traveling lane and on which the subject vehicle is scheduled to travel.

4. The travel assistance method according to claim 1, comprising:

calculating a control command value for traveling the subject vehicle along the target traveling path; and controlling the subject vehicle based on the control command value.

5. The travel assistance method according to claim 4, wherein a calculation cycle of the processor in a process of generating the static traveling path is longer than a calculation cycle of the processor in a process of calculating the control command value.

6. The travel assistance method according to claim 4, wherein a calculation cycle of the processor in a process of generating the dynamic traveling path is longer than a calculation cycle of the processor in a process of calculating the control command value.

7. The travel assistance method according to claim 4, comprising:

correcting, in a process of calculating the control command value, the target traveling path by reflecting a travel distance of the subject vehicle during a period for which the control command value is calculated in the target traveling path.

8. The travel assistance method according to claim 7, comprising:

estimating a position of the subject vehicle on a map, based on the map information and detection results of the sensor; and performing, in a process of correcting the target traveling path, a coordinate transform process to transform a coordinate defining the target traveling path from a coordinate system based on a position of the subject vehicle to a coordinate system based on the position of the subject vehicle on the map, and then correcting the target traveling path using a calculation cycle of the processor in a process of calculating the control command value.

9. The travel assistance method according to claim 1, comprising:

generating, in a process of generating the static traveling path, the static traveling path in which a change of lateral acceleration applied to the subject vehicle when the subject vehicle travels is less than a predetermined value, based on the information on the static traveling path boundaries.

10. The travel assistance method according to claim 1, comprising:

generating, in a process of generating the dynamic traveling path, the dynamic traveling path in which a change of lateral acceleration applied to the subject vehicle when the subject vehicle travels is less than a predetermined value, based on the information on the static traveling path and the dynamic traveling path boundaries.

11. The travel assistance method according to claim 1, comprising:

generating the target traveling path by combining the dynamic traveling path and the static traveling path so that an end point of the dynamic traveling path is placed on the static traveling path.

12. The travel assistance method according to claim 1, comprising:

correcting, in a process of generating the dynamic traveling path, the static traveling path by reflecting a travel distance of the subject vehicle during a period for which the dynamic traveling path is generated in the static traveling path.

13. The travel assistance method according to claim 1, comprising:

estimating a position of the subject vehicle on a map, based on the map information and detection results of the sensor; and performing, in a process of correcting the static traveling path, a coordinate transformation process to transform a coordinate defining the static traveling path from a coordinate system centered on a position of the subject vehicle to a coordinate system centered on the position of the subject vehicle on the map, and then correcting the static traveling path using a calculation cycle of the processor in a process of generating the dynamic traveling path.

14. The travel assistance method according to claim 1, comprising:

generating the traveling path with a minimum change of curvature, as the static traveling path.

15. The travel assistance method according to claim 1, comprising:

setting a path length of the static traveling path to include at least two corners.

16. The travel assistance method according to claim 1, comprising:

setting a path length of the static traveling path to include a section of straight path for a predetermined distance or more after a corner.

17. The travel assistance method according to claim 1, comprising:

setting a path length of the dynamic traveling path so that the dynamic traveling path is included within a detection range of the sensor.

18. The travel assistance method according to claim 1, comprising:

identifying the dynamic traveling path boundaries as first dynamic traveling path boundaries, wherein the dynamic traveling path boundaries are road surface markings; and identifying the dynamic traveling path boundaries as second dynamic traveling path boundaries, wherein the second dynamic traveling path boundaries are obstacles existing around the subject vehicle.

19. The travel assistance method according to claim 18, comprising:

generating the dynamic traveling path using a relationship of decreasing influence of the second dynamic traveling path boundaries on the dynamic traveling path, influence of the first dynamic traveling path boundaries on the dynamic traveling path, and influence of the static traveling path boundaries on the dynamic traveling path, in that order.

20. A travel assistance device comprising a processor, the processor configured to:

acquire, from a device for storing map information, information on static traveling path boundaries between a traveling path of a subject vehicle and other than the traveling path;

acquire, from a sensor for detecting surrounding environment of the subject vehicle, information on dynamic traveling path boundaries different from the static traveling path boundaries;

generate, based on the information on the static traveling path boundaries, a static traveling path on which the vehicle can travel;

generate, based on the information on the static traveling path and the dynamic traveling path boundaries, a dynamic traveling path which is shorter than the static traveling path and corresponds to the surrounding environment; and control the subject vehicle to travel along a target traveling path including the static traveling path and the dynamic traveling path, wherein a calculation cycle of the processor in a process of generating the static traveling path is longer than a calculation cycle of the processor in a process of generating the dynamic traveling path.

* * * * *